Figures 1, 2:
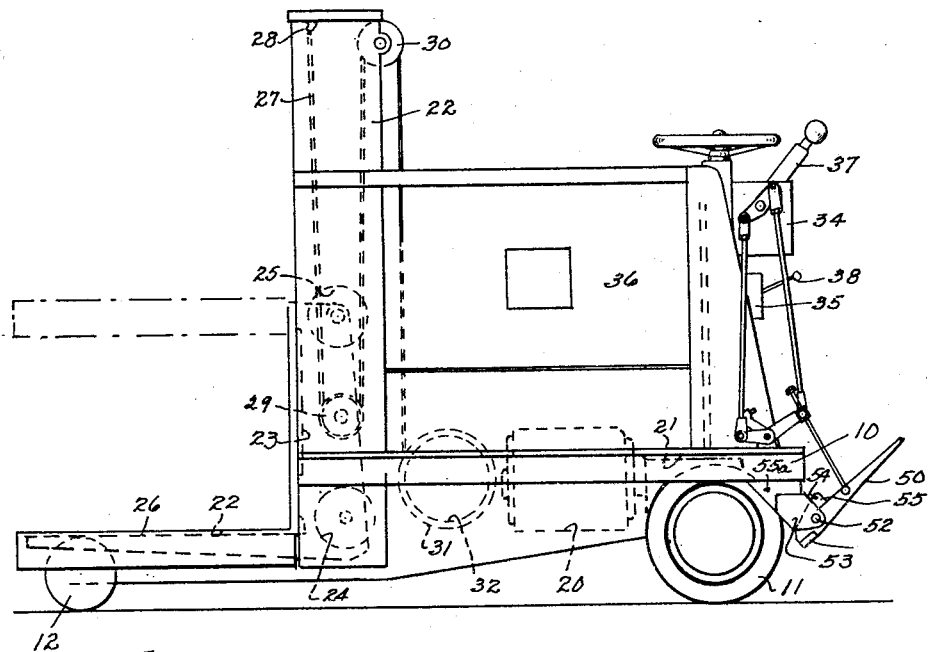

Sept. 27, 1932.  C. E. COCHRAN  1,879,096
INDUSTRIAL TRUCK
Filed Aug. 1, 1931   3 Sheets-Sheet 1

Inventor
Clyde E. Cochran
By Bates, Golrick & Teare
Attorneys

Sept. 27, 1932.   C. E. COCHRAN   1,879,096
INDUSTRIAL TRUCK
Filed Aug. 1, 1931   3 Sheets-Sheet 2
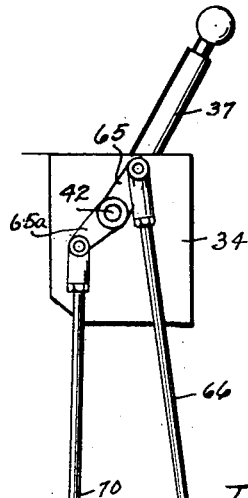
FIG.-3
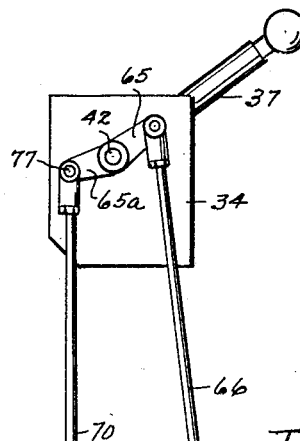
FIG.-4
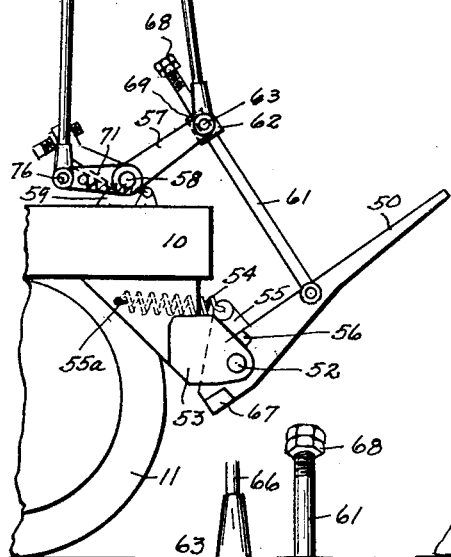
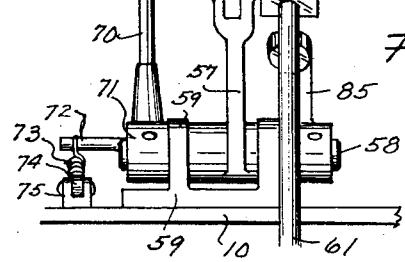
FIG.-8
Inventor
Clyde E. Cochran
By Bates, Goldrick & Teare
Attorneys Sept. 27, 1932.  C. E. COCHRAN  1,879,096
INDUSTRIAL TRUCK
Filed Aug. 1, 1931  3 Sheets-Sheet 3
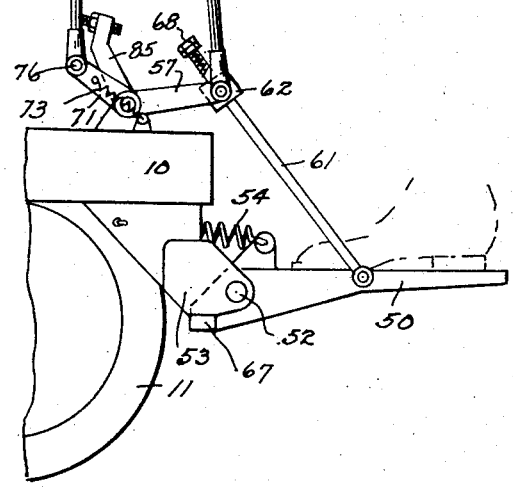
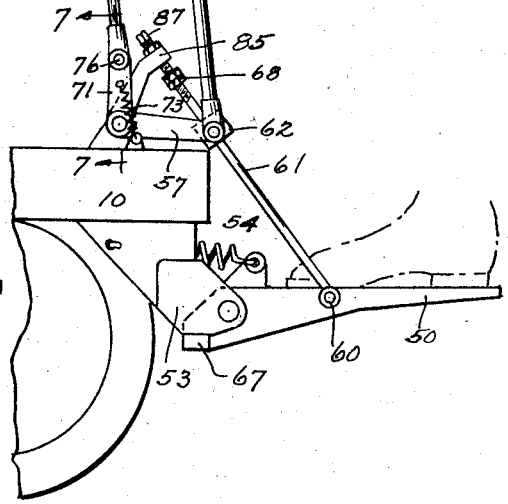
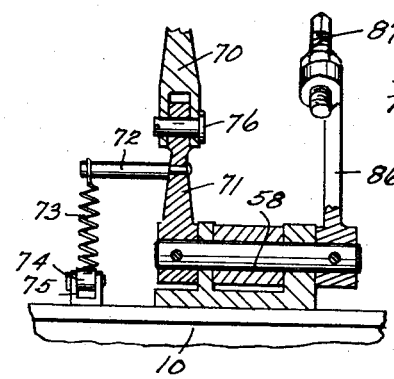
Inventor
Clyde E. Cochran
By Bates, Golrick & Teare
Attorneys Patented Sept. 27, 1932

1,879,096

UNITED STATES PATENT OFFICE

CLYDE E. COCHRAN, OF CLEVELAND, OHIO, ASSIGNOR TO THE ELWELL PARKER ELECTRIC COMPANY, OF CLEVELAND, OHIO, A CORPORATION OF OHIO

INDUSTRIAL TRUCK

Application filed August 1, 1931. Serial No. 554,519.

This invention relates to industrial trucks of the electric propelled type, and especially to a control mechanism for the truck propelling motor, and is an improvement over that shown in my prior Patent No. 1,492,701, issued May 6th, 1924.

Trucks, of the nature to which this invention relates, generally comprise a main frame provided with suitable wheels. One pair of wheels are arranged to be propelled by a motor, which is controlled by a suitable hand operated controller unit. These driving wheels are often dirigible and are connected by a series of steering links to a steering arm or wheel. Such trucks generally carry a load engaging or elevating mechanism, which mechanism is usually operated by an independent motor, provided with an independent operating controller.

When operating trucks of this type, it is often desirable to elevate or manœuvre the load, relative to the truck itself, while the latter is in motion. By so doing, considerable time is saved, as the load may be elevated so that it may be deposited on top of another load, or it may be rotated end for end as desired while the truck is in motion, thereby enabling the truck to handle considerably more material than would otherwise be possible.

It is readily seen that in a truck of this type the operator would have to handle the propelling motor controller, the steering wheel, as well as the load handling motor controller. This, it will be seen, would be exceedingly difficult. In the past, as shown in my prior Patent No. 1,492,701, it was customary to so arrange the brake control mechanism and the propelling motor control, in such a manner that they were operated by shifting of the operator's weight from one platform support to another. This permitted the operator to handle the steering arrangement with one hand and the load handling controller with the other hand.

The present invention is an improvement over the controller mechanism shown in the prior patent, and the arrangement is such that the operator will not accidently shift the propelling motor control unit from one speed to another by a slight movement of the operating pedals. The arrangement also permits the placing of the controller in low speed or high speed, and permits the operator to retain the controller in such speeds by merely placing his weight upon one of the supporting platforms.

The general object of this invention is to provide an improved speed control mechanism, associated with an operator's support, whereby the certain speeds of the vehicle may be controlled by the operator shifting his weight on a movable platform support, and wherein certain other speeds are controlled by a manually movable controller unit.

A further object of this invention is to provide a control unit for the propelling motor of an industrial truck, which control unit is so arranged that it may be operated by the operator shifting his weight on a movable platform support and so arranged that a slight shifting of the operator's weight will not operate to vary the speed of the motor.

A more specific object of the present invention is the provision of a pedal operated motor control mechanism, wherein the pedal is so connected to the controller as to shift the controller into its first operating speed, by the operator shifting his weight on the movable platform support. Thereafter, the motor may be operated at other speeds by a manually operated lever, and wherein the pedal control arrangement is such that it will retain the controller in the position set by the manually operated lever.

Other objects of this invention will become apparent from the following description, taken in connection with the accompanying drawings, and the essential features thereof will be summarized in the claims.

In the drawings, Fig. 1 is a side elevation of an industrial truck embodying my improved control mechanism; Fig. 2 is an elevation of the truck, looking at the control end thereof, certain portions of the controller being broken away, to more clearly illustrate the internal construction thereof; Fig. 3 is an enlarged fragmental elevation of the control mechanism; Figs. 4, 5 and 6 are elevations similar to Fig. 3, but illustrating the parts in different positions; Fig. 7 is a detailed section, as indicated by the lines 7—7 on Fig. 6; Fig. 8 is an elevation of the parts illustrated in Fig. 7.

Referring again to the drawings, I have shown my improved control mechanism, as mounted on an industrial truck, of the type similar to that shown in the prior patent to Clyde E. Cochran, No. 1,538,168, issued May 19th, 1925. In general, this truck comprises a main frame 10, supported at one end by suitable driving wheels 11, and at the other end by suitable load carrying wheels 12. The arrangement is such that the driving wheels 11 are dirigible and are connected by suitable steering links 15 and 16 and gearings 17 to a steering post 18, mounted at the forward end of the truck and provided with a suitable steering wheel 19. In the arrangement shown, the wheels 11 are propelled by a suitable motor 20, which, through differential gearings contained within a housing 21, operates in the usual manner through suitable universal joints, to drive the wheels 11.

The load handling mechanism, as shown in the drawings, comprises a substantially upright guideway 22, located intermediate the two pairs of wheels. Mounted for vertical movement in this guideway 22 is a suitable carriage 23, provided with wheels 24 and 25 arranged to coact with the guideway members. This carriage 23, together with a load supporting platform 26 carried thereby, is raised and lowered in the guideway 22 by a cable 27. The cable 27 is secured as at 28 to the upper end of the guideway 22 and passes downwardly and around a pulley 29, rotatively secured to the carriage 23, thence upwardly to a pulley 30, mounted adjacent the top of the guideway 22, and thence downwardly through a winding drum 31, mounted adjacent the lower portion of the truck. The winding drum 31 is propelled by a motor 32.

The motors 20 and 32 are controlled by suitable controllers 34 and 35, respectively, which are supplied with electrical energy from a battery, not shown, but contained within a housing 36, located intermediate the front end of the truck and the vertical guideway 22. The controllers 34 and 35 are conveniently located relative to the steering wheel 19, and are of the rotary drum type, and are operated by suitable handles 37 and 38, respectively. The construction of the controllers 34 and 35 is such that they are normally retained in a neutral position by suitable springs, one of which is shown at 39, Fig. 2. One end of the spring 39 is secured to the controller housing 40, while the other end thereof is secured to a disc member 41, which in turn is secured to the controller shaft 42 and carries the control handle 37. The controller 38 is similarly arranged.

The controller I prefer to use is of the type illustrated in the former Patent No. 1,783,763, issued to Edward J. Abbe, December 2nd, 1930, and comprises a casing 40 having two sets of stationary contacts 43 and 44. The contacts 43 are adapted to be engaged by rotary contact members 45, carried by a drum 46 secured to the shaft 42. The contacts are arranged to cut out suitable resistance units successively, and are so arranged as to operate the motor 20 at three different speeds. The contacts 44 are arranged to contact with movable contacts 46a, carried by a supplementary drum 47, which is revolvable about the shaft 42 and operated by a suitable lever 48. The contacts 44 and 46a serve to cause the current to flow to the motor in such a manner as to control the direction of rotation of the motor and accordingly the direction of movement of the truck.

The controller 34 is so arranged that it may be operated by suitable platform members arranged to support the operator of the truck. As shown in the drawings, there are a pair of platform members 50 and 51 pivoted as at 52, to brackets 53, which extend downwardly from the forward end of the frame 10 of the truck. The platform members 50 and 51 are normally retained in their extreme counter-clockwise position by means of suitable springs 54, one end of each of which is secured to an ear 55, of its respective platform member, and the other end is secured to the truck frame, as indicated at 55a in Fig. 3. The platforms 50 and 51 are provided with suitable stops 56, which engage the brackets 53, and serve to limit the upward or counter-clockwise movement of the platforms.

The arrangement is such that the controller 34, when in its "off" position, is swung to its extreme counter-clockwise position, as shown in Fig. 3. To operate the truck, the control lever is swung clockwise from the position shown in Fig. 3, to that shown in Figs. 4 to 6, inclusive. Fig. 4, showing the first operating or low speed position, Fig. 5, the second operating or intermediate speed position, while Fig. 6 illustrates the third operating or highest speed position. It is, of course, understood that there may be other intermediate speeds than those shown. However, those shown serve to illustrate my invention.

As shown in Fig. 3, the arrangement of the operator's platform 50 is such that it is operably connected by suitable linkage to the controller shaft 42. The linkage arrangement is such that the movement of the platform 50 rocks the controller to its first or low speed position, at which position the motor 20 is rotating at its lowest operating speed.

The linkage which connects the platform 50 to the controller 34 is best illustrated in Figs. 3 to 8, inclusive, and comprises a lever 65 rigidly secured to the controller shaft 42, and which is connected by a suitable link 66 to a lever 57 rotatably mounted on a shaft 58, rotatably mounted in a bearing block 59, carried by the frame 10 of the truck. Pivotally secured to the platform member 50, as at 60, is a rod 61, which is slidably mounted in a block 62, rigidly secured to a pin 63, pivotally carried by the lever 57. The upper end of the rod 61 is threaded and provided with a pair of lock nuts 68, which are adapted to engage the upper face 69 of the block 62. When the operator places his weight on the platform 50, the latter is caused to swing downwardly in a clockwise direction, until a stop 67 on the platform engages a bracket 53, which position is shown in Fig. 5. Before the stop 67 engages a bracket 53, the nut 68 on the rod 61 is brought downwardly to a position to contact with the block 62, and then operates to swing the lever 57 in a clockwise direction, thereby through the link 66, operating to swing the lever 65, causing the controller shaft 42 to be swung in a clockwise direction. When the stop 67 contacts with the bracket 53, the controller drum 46 will have been rotated to a position where two of the contacts 43 are in engagement with the drum contacts 45, in which position the controller 34 is operatively connected to the motor 20 to rotate the latter at its first or lowest running speed.

It is often desirable, when the truck is to be operated over uneven roads, to provide additional power to the motor. In the present invention this may be applied by manually operating the controller handle 37, rotating it downwardly in a clockwise position, from the position shown in Fig. 4 to that shown in Fig. 5. When the handle is manually operated to the second position, that shown in Fig. 5, the lever 65 is rocked still clockwise, causing the block 62 to slide downwardly along the rod or bar 61, thereby having no effect upon the platform 50.

When the truck is operating without a load, such as on a return trip, having deposited a load it is often desirable to operate the truck at the highest rate of speed, and during this time it is also desirable to return the load handling mechanism to a position where it may engage the second load. I therefore arrange the linkage, connecting the controller 34 to the platform member 50, in such a manner that it will retain the controller 34 in its high speed position. However, I prefer to arrange the controller 34 so that it can be swung to the high speed position only by the operating handle 37. The operator, when desiring to operate the truck at the highest speed, manually swings the handle 37 from the position shown in Fig. 5, to that shown in Fig. 6, in which position he may then release the controller and it will remain in such position until the operator's weight is removed from the platform 50. This construction enables the operator to handle the load engaging members and steer the truck, without having to operate the controller 34 manually. The arrangement is such that the operator may, by removing his weight from the platform member 50, return the controller to a neutral or "off" position, and then by again placing his weight on the platform 50 he may return the controller to its low speed position.

To lock the controller in a high speed position against the action of the spring 39 (Fig. 1), the lever 65 is provided with a rearwardly extending arm 65a, which is connected by a link 70, to a lever 71 rigidly secured to the rock shaft 58, heretofore mentioned. When the controller handle 37 is rocked to the high speed position, all five contacts 43 are engaged by the contact members 45, and the lever arrangement is such that a spring 73, one end of which is secured to a pin 72, carried by the lever 71, and the other end to a pivot block 74, mounted in a bracket 75, secured to the frame 10, acts to throw the pivot 76 between the link 70 and the lever 71, to a position forward of a straight line drawn between the pivot 77, between the link 70 and the lever arm 65, and the rock shaft 58. Hence, when the controller handle 37 is released by the operator, the action of the controller spring 39, heretofore described, will tend to rotate the controller drum in a counterclockwise direction. This will tend to rotate the lever 65 in a similar direction, causing a downward motion on the link 70, and tending to rotate the shaft 58 in a clockwise direction. The movement of the shaft, however, being limited, the controller handle 37 is locked in its high speed position.

The limiting device for the clockwise movement of the shaft 58 comprises a lever 85, rigidly secured to the shaft 58, and carrying at its outer end an adjusting screw 87. The adjusting screw 87 is arranged to contact with the upper end of the rod 61, thereby preventing further clockwise movement of the rock shaft 58, and retaining the controller 34 locked in the high speed position.

The operator may, by removing his weight from the platform 50, cause the toggle, comprising the links 70 and 71, to be thrown across the dead center point, and enable the controller spring 39 to quickly return the controller to its neutral or "off" position. As shown in Fig. 6, it is evident that when the operator takes his weight from the platform member 50, the platform 50 will be rotated in a counter-clockwise direction, by the comparatively heavy spring 54, heretofore mentioned. This will cause the upper end of the rod or bar 61, to strike the adjusting screw 87, carried by the lever 85, and rock the lever, together with the shaft 58 and lever 71, counterclockwise, until the pivot 76 is on the left-hand side of the line drawn between the pivot 77 and the rock shaft 58, at which time the controller spring 39 will act to cause the controller to immediately shift to its neutral or "off" position.

If the operator should thereafter desire to have the truck operate at its low speed, he simply needs again to shift his weight onto the platform 50, which will automatically cause the controller to shift to its low speed, as heretofore described.

From the foregoing description, it will be evident that I have provided an improved control mechanism for an electrically propelled industrial truck, wherein the operator may safely control the propelling of the truck by shifting his weight to and from a foot pedal or operator's platform, and the arrangement is such that the operator may, by shifting his weight, operate the controller to one position, and thereafter operate the controller to a second position manually, by use of an operating handle arranged to be operated independent of the operation of the platform. The mechanism associated with the foot pedal is also so constructed as to retain the controller in its advanced position, until the operator releases his weight from the foot pedal, thereby permitting the operator to devote his entire attention to the steering of the truck and the operating of the load engaging mechanism.

I claim:

1. In an industrial truck, the combination of a motor, a controller for governing the speed of said motor, an operator's support, mechanism connecting the controller with the operator's support and adapted to operate the controller to cause the motor to rotate at a predetermined speed, and means whereby the controller may be operated independently of said operator's support.

2. In an industrial truck, the combination of a motor, wheels drivingly connected to said motor, a controller for governing the speed of said motor, an operator's support, mechanism connecting the controller with operator's support and arranged to operate the controller to cause the motor to rotate at a predetermined speed, and means independent of said operator's support whereby the controller may be thereafter operated without affecting the position of said operator's support.

3. In an industrial truck, the combination of an electric motor, a controller for governing the speed of said motor, an operator's support, mechanism connecting the controller with the operator's support and adapted to operate the controller to cause the motor to rotate at a compartively low speed, and means whereby the controller may be operated at other speeds independently of said operator's support.

4. In an industrial truck, a motor, wheels drivingly connected to said motor and arranged to propel the truck, a controller for governing the speed of said motor, a movable operator's support, mechanism connecting the controller with the operator's support, said mechanism arranged to operate the controller to cause the motor to rotate at a predetermined speed, means independent of said operator's support whereby the controller may be thereafter operated to a different position, and mechanism to retain the controller in said last named position independent of said last named means.

5. In an industrial truck, an electric motor, wheels drivingly connected to said motor and arranged to propel the truck, a controller for governing the speed of said motor, a movable operator's support, mechanism connecting the controller with the operator's support and arranged to operate the controller and to cause the motor to rotate at a comparatively low operating speed, means independent of said operator's support whereby the controller may be thereafter operated to other positions, and mechanism associated with said controller to lock the controller in the highest operating speed position.

6. In an industrial truck, an electric motor arranged to propel the truck, a controller for governing the speed of said motor, an operator's support, mechanism connecting the controller with said operator's support and arranged to operate the controller to effect a predetermined motor speed, manually operable means independent of said operator's support to operate the controller to effect another motor speed, means to retain the controller in the last named operating position, and means associated with said operator's support to release said retaining means.

7. In an industrial truck, an electric motor arranged to propel the truck, a controller for governing the speed of said motor, an operator's support, mechanism connecting the controller with said operator's support and arranged to operate the controller to effect the lowest operating speed of the motor, manually operable means independent of said operator's support to operate the controller to effect other motor speeds, means to lock the controller in the position which effects the highest motor operating speed and means associated with said operator's support to release said lock.

8. In an industrial truck, an electric motor arranged to propel the truck, a controller for governing the speed of said motor, an operator's support, mechanism connecting the controller with said operator's support and arranged to operate the controller to effect a predetermined motor speed when the operator rests his weight on said support, manually operable means independent of said operator's support to operate the controller to effect another motor speed, means to retain the controller in the last named operating position while the operator's weight is on said support and means associated with said operator's support to release said retaining means when the operator removes his weight from said support.

9. In an industrial truck, a motor, a controller adapted to operate the motor at various speeds, an operator's support, mechanism connected with the controller and the operator's support, whereby the varying of the operator's weight upon the support will operate to throw the controller into a position to operate the motor at one speed, and means independent of said operator's support to manually throw the controller to a position wherein the motor operates at another speed, and mechanism to lock the controller in said second named position until the support is relieved of the operator's weight.

10. In an industrial truck, a motor, a controller adapted to operate the motor at various speeds, an operator's support, mechanism connected with the controller and the operator's support whereby the operator's weight upon the support will operate to throw the controller into one position, and means independent of said platform whereby the controller is manually operable to another position and a toggle mechanism arranged to retain the controller in said second named position until the operator relieves the support of his weight.

11. In an industrial truck, a motor, a controller adapted to operate the motor at various speeds, said controller including resilient means constantly acting to retain it in an "off" position, an operator's support, mechanism connected with the controller and the operator's support, whereby the varying of the operator's weight upon the support will throw the controller to a position whereby the motor will operate at one speed, means to operate the controller to a position whereby the motor will operate at another speed; and a toggle mechanism arranged to retain the controller in said second named speed against the action of said resilient means, and means connected with said support and arranged to act on the toggle mechanism to permit the resilient means to throw the controller to an "off" position.

12. In an industrial truck, a motor, a controller adapted to operate the motor at various speeds, said controller including resilient means constantly acting to retain it in an "off" position, an operator's support, mechanism connected with the controller and the operator's support whereby the placing of the operator's weight upon the support will throw the controller to a position whereby the motor will operate at one speed, manually operable means connected with said controller to throw it to a plurality of other positions whereby the motor will operate at other speeds, and a toggle mechanism arranged to retain the controller in one of said last named speeds against the action of said resilient means, and means connected with said support and arranged to act on the toggle mechanism to permit the resilient means to throw the controller to an "off" position.

13. In an industrial truck, a motor, a controller adapted to operate the motor at various speeds, said controller including resilient means constantly acting to retain it in an "off" position, an operator's support, mechanism connected with the controller and the operator's support, whereby the positioning of the operator's weight upon the support will throw the controller to a position whereby the motor will operate at its lowest operating speed, manually operable means connected with said controller to be thrown to a plurality of positions whereby the motor will operate at other speeds, said resilient means acting to return the controller to its first-named operating position when the manually operated means is released, and mechanism arranged to retain the controller in the said highest operating speed against the action of said resilient means, and means connected with said support and arranged to release said last named mechanism.

14. In an industrial truck, a motor for propelling said truck, a controller arranged to vary the speed of said motor, said controller including an operating shaft, a manually operable handle secured to said shaft, an arm secured to said shaft, a rock shaft mounted on the truck, a pair of levers carried by said rock shaft, independent links connecting respective levers to the said arm, an operator's supporting platform pivotally connected to the truck, resilient means acting on said platform to rock it upwardly, and means including a lost motion device connecting said platform with one of said levers to throw the controller to a predetermined operating position, the other of said levers and its respective link arranged to form a toggle to lock the controller in a second predetermined operating position.

15. In an industrial truck, an electric motor for propelling said truck, a controller arranged to vary the speed of said motor, said controller including an operating shaft, a manually operable handle secured to said shaft, an arm secured intermediate its ends to said shaft, a rock shaft mounted on the truck, a pair of independently movable levers carried by said rock shaft, independent links connecting respective levers to opposite ends of said arm, an operator's supporting platform pivotally connected to the truck, resilient means acting on said platform to rock it upwardly, and means including a lost motion device connecting said platform with one of said levers to throw the controller to a predetermined operating position, the other of said last named levers and its respective link arranged to form a toggle to lock the controller in a second predetermined operating position, resilient means to retain the toggle in said locked position, and means operated by the platform to release said toggle and permit the controller spring to return the controller to an "off" position.

In testimony whereof, I hereunto affix my signature.

CLYDE E. COCHRAN.